United States Patent

[11] 3,544,044

| [72] | Inventor | Bernhardt Stahmer |
| | | 1509 Chicago St., Omaha, Nebraska 68102 |
| [21] | Appl. No. | 742,210 |
| [22] | Filed | July 3, 1968 |
| [45] | Patented | Dec. 1, 1970 |

[54] AIRPORT WITH MANUFACTURED SURFACE WINDS
9 Claims, 5 Drawing Figs.

[52] U.S. Cl. ...................................... 244/114
[51] Int. Cl. ...................................... B64f 1/00
[50] Field of Search ............................ 244/114, 115, 110, 63; 114/43.5

[56] References Cited
UNITED STATES PATENTS

| 1,796,693 | 3/1931 | Schimmel III | 244/114X |
| 2,355,948 | 8/1944 | Bonstow et al. | 244/114X |
| 3,023,986 | 3/1962 | Nallinger | 244/114 |
| 3,143,322 | 8/1964 | Mainwaring | 244/114 |
| 3,196,822 | 7/1965 | Bertin et al. | 244/114 |

FOREIGN PATENTS

| 493,176 | 5/1950 | Belgium | 244/114 |
| 1,164,245 | 2/1964 | Germany | 244/114 |
| 868,342 | 5/1961 | Great Britain | 244/114 |
| 543,833 | 5/1956 | Italy | 244/114 |

*Primary Examiner*—Milton Buchler
*Assistant Examiner*—Paul E. Sauberer
*Attorney*—George R. Nimmer ABSTRACT: This invention relates to airports for self-powered aerodynamic aircraft and having at least one elongate horizontal hard-surfaced runway whereby the aircraft might accelerate itself along the runway surface and through the ambient air disposed above the runway until the rate of air flow encountered frontally by the airfoil structure of the horizontally self-propelled aircraft reaches the critical level appropriate to the aircraft's weight and design causing the aircraft to be lifted above the earth; in particular, this invention relates to an airport that includes remotely controllable stationary apparatus for manufacturing airstreams and directing them along and above the runway as a ground wind to provide more favorable ambient air conditions whereby the aircraft's airfoil structure will be frontally subjected to the critical level of air volume with the expenditure of less energy by the aircraft's own power plant.

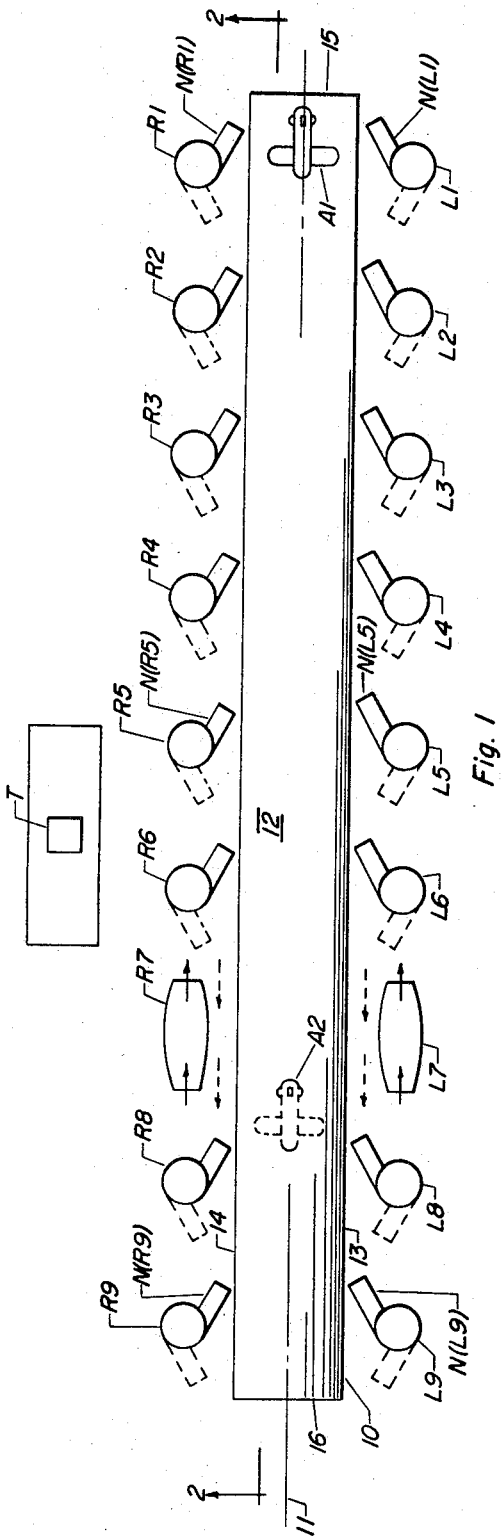
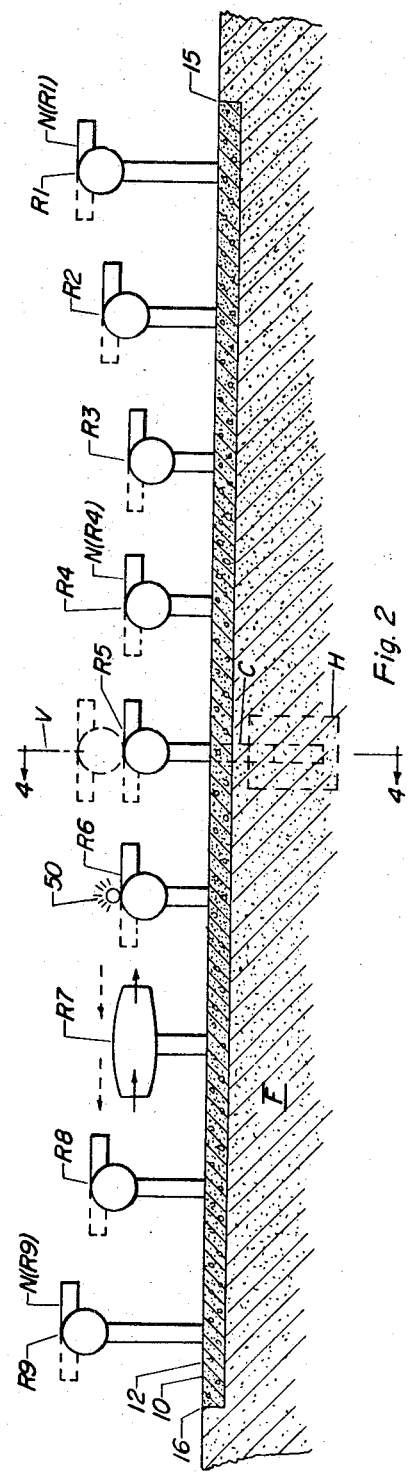

AIRPORT WITH MANUFACTURED SURFACE WINDS

It is a basic aerodynamic principle that heavier-than-air aircraft will rise or lift above the earth when sufficient volumes of air per unit time pass frontally against and over the aircraft's airfoil wings. In addition to the airfoil wings, conventional self-powered aerodynamic aircraft comprise: a longitudinal fuselage attached to the transverse airfoil wings; wheels attached to the wings and/or to the fuselage whereby the aircraft is adapted to roll along a horizontal runway during takeoff and landing; a power plant for thrusting the aircraft forwardly through the ambient air, such as an internal combustion engine driving a propeller that churns its way through the ambient air or jets delivering a rearward stream of hot gas; and a fuel supply to maintain the thrust means. Thus, during the takeoff operation of a conventional self-powered aerodynamic aircraft, the aircraft is first positioned at the first transverse end of the elongate horizontal runway and the aircraft's self-powered thrust means is actuated causing the aircraft to roll along the length of the runway toward the second end thereof; as the aircraft speed accelerates ever increasing rates of ambient air are subjected frontally against the airfoil wings, and ultimately, when the rate of air flow reaches the critical level for the weight and design of the specific aircraft involved, the aircraft lifts above the earth by virtue of well-known aerodynamic laws.

The critical air volume necessary to lift an aerodynamic aircraft above the earth is proportional the the aircraft's total weight, including the weight of the thrust means and the fuel supply therefor; greater air volumes per unit time must be subjected frontally against the airfoil for heavier aircraft than for smaller and lighter aircraft. Accordingly, very large and heavy aircraft concomitantly require exceedingly large and heavy power plants and fuel supplies for accelerating the prodigious ship along the hard-surfaced runway until the aircraft reaches sufficient speed relative to the ambient air that there is the critical volume of air subjected along the airfoil whereby the aircraft lifts upwardly from the earth. For very large and heavy aircraft runway lengths of several thousand feet are required for the aircraft to accelerate itself to the level wherein the critical volume of ambient air passes over the airfoil per unit time. Indeed, a significant proportion of the aircraft's aggregate weight includes the great amount of power plant and fuel required for the runway acceleration until the craft is airborne. Per unit time of operation, an aircraft requires more power plant and fuel during the takeoff and eventual landing operations than during the intermediate flight between airports; thus, because of the power plant and fuel requirements during takeoff and landing, a portion of the available payload of an aircraft between origin and destination airports is necessarily sacrificed.

In conventional practice, if there are natural ground winds present, the aircraft utilizes for takeoff and for landing a runway that lies directionally along the main vector of the prevailing ground wind, the aircraft taking off or landing against the maximum degree of head wind. Thus, during takeoff less aircraft acceleration along the runway is required to attain the critical air volume rate for lift, thus requiring less runway length and fuel for lift; moreover, during landing not only is less runway length and fuel required to bring the aircraft to rest, but less friction is subjected to the aircraft's wheels. Under normal landing operations, unless there are significant natural ground winds present, a great deal of wear results to the aircraft's rubber wheels to the extent that the rubber tires must be replaced frequently. Unless there are significant natural ground winds present, and unless at least one airport runway is so geographically positioned to take advantage of a significant vectorial proportional thereof, an aircraft of given aerodynamic design or weight might find it exceedingly difficult or even impossible to takeoff from or land onto an airport's available runway structure.

It is accordingly the general object of the present invention to reduce the amount of power plant and fuel required by any given self-propelled aerodynamic aircraft for takeoff and landing operations whereby the available payload for the aircraft between origin and destination airports might be increased.

It is another general object of the present invention to reduce the amount of runway length required by any given self-propelled aerodynamic aircraft for takeoff and landing operations whereby the amount of valuable field terrain required for new airport installations is reduced and whereby there is provided for existing airport installations the capacity to more safely accommodate existing aircraft traffic.

It is a further object of the present invention to provide a means to assist the takeoff and landing of aerodynamic aircraft from the runway deck of an aircraft carrier-type warship.

It is another object of the present invention to reduce the frictional wear normally encountered by the aircraft's wheels during the landing operation.

With the above and other objects and advantages in view, which will become more apparent as this description proceeds, this invention comprises an airport installation having at least one elongate horizontal hard-surfaced runway and permanently land-based apparatus for manufacturing artificial airstreams as supplemental ground winds and for directing a major vectorial portion of same parallel to the longitudinal axis of the runway whereby taking off and landing of aerodynamic aircraft upon the runway is facilitated.

FIG. 1 is a schematic top plan view of a typical airport having, according to the spirit of the present invention, land-based apparatus for the manufacture of artificial ground winds.

FIG. 2 is a sectional elevational view taken along line 2–2 of FIG. 1.

Figure 3:
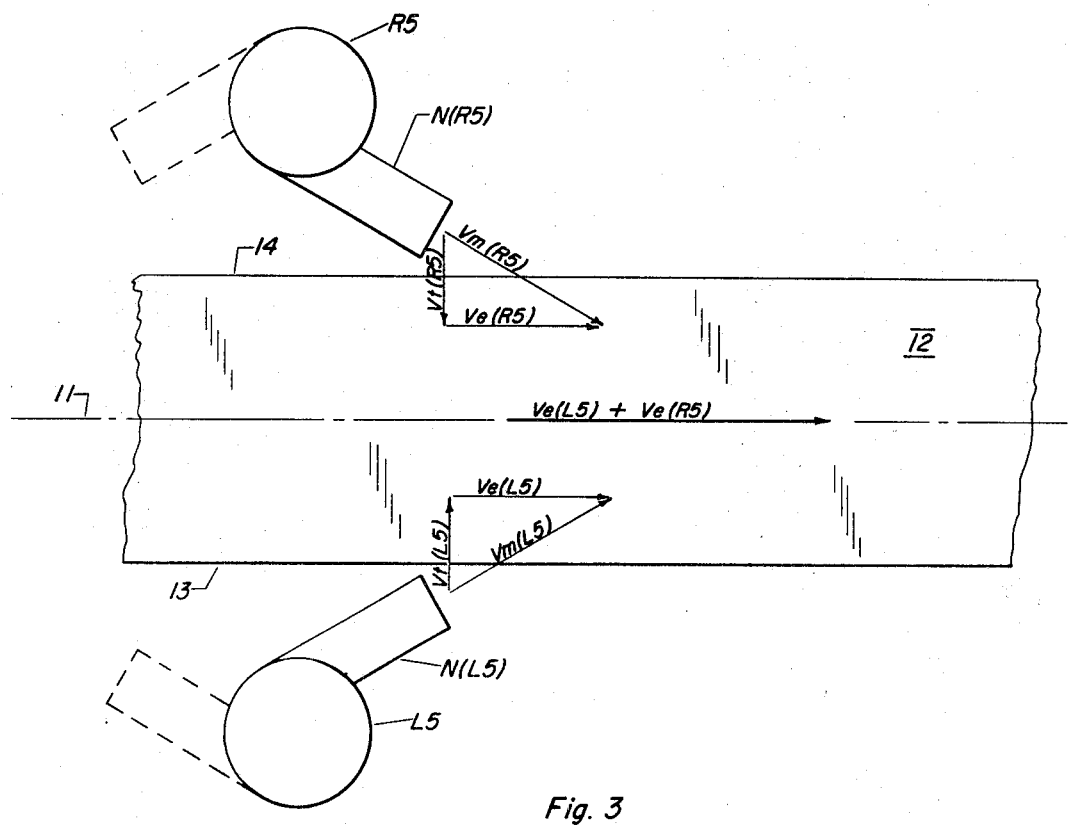
FIG. 3 is a detail plan view in amplification of FIG. 1 showing in particular the vectorial components of the artificial ground winds manufactured at the airport installation of the present invention.

As can best be shown in the general views provided in FIGS. 1 and 2 of the drawing, this invention relates to an improvement for prior art airport sites that typically include at least one elongate horizontal hard-surfaced runway 10 comprising a substantially planar horizontal hard upper surface 12 of finite transverse width disposed along a longitudinal horizontal axis 11 whereby self-powered aerodynamic aircraft (as indicated as A1 and A2 in FIG. 1) are permitted to rollably traverse along surface 12 parallel to axis 11 ancillary to the taking off or landing of said aerodynamic aircraft. Traditionally, the runway 10 has a pair of parallel elongate edges positioned along opposite sides of axis 11 including a first elongate (herein a "leftward") edge 13 and a second elongate (herein a "rightward") edge 14, and runway 10 has a pair of transverse ends including herein a first end 15 and a second end 16. Moreover, the typical prior art airport has a control tower T positioned upon the airport substrate F and located some finite distance remote of runway 10 for signaling and otherwise directing the aircraft traffic utilizing runway 10. Both the runway 10 and control tower T components of typical prior art airports are fixedly attached to the airport's underlying substrate; although the airport's underlying substrate might be a large water vessel such as an aircraft carrier ship, the substrate shown in the drawing is a terrestial field of hard-packed earth F. While the subsequent description of the airport installation is devoted primarily to terrestial installations, it is to be understood that the principles of the present invention are applicable also to sea-going aircraft carriers having runway decks and traffic control towers.

Disposed along the airport runway 10 is at least one powered air blower device e.g. L5, adapted to generate an airstream, indicated schematically in FIG. 3 as finite-length arrow Vm(L5), having some finite magnitude expressed in air volume per unit time such as in cubic feet per minute. Each powered air blower device has a nozzle means e.g. N(15) of air blower L5, N(R5) of air blower R5, etc. adapted to direct the airstream e.g. Vm(L5), Vm(R5) of R5, parallel to and above the runway upper surface 12 with a major vectorial portion e.g. Ve(L5) of L5, Ve(R5) of R5, of each said airstream being directed horizontally and parallel to runway axis 11 and to runway upper surface 12. Preferably, there is a plurality of powered air blowers spaced at regular intervals along opposite sides of runway longitudinal axis 11, herein nine such air blowers L1—L9 L9 being spaced at regular intervals along runway first elongate edge 13 and another nine such air blowers R1—R9 spaced at regular intervals along runway second elongate edge 14. The respective powered air blowers might be disposed either above runway upper surface 12, or disposed below runway 10 in the earth F, so long as the nozzle means directs the airstream above runway upper surface 12 as previously indicated.

Pairs of powered air blowers on respective sides of runway axis 11 are transversely alined i.e. air blowers L1, and R1, L2 and R2, etc. with deliverable air rates of respective transversely alined pairs being substantially equal whereby the major vectorial portion of the aggregate airstream resulting from a respective air blower pair lies substantially along the runway axis 11. Thus, the aggregate major vectorial portion of any transversely alined pair of air blowers lies substantially along runway longitudinal axis 11. For example, as illustrated in FIG. 3 with a finite-length arrow Ve(L5)+Ve(R5) along axis 22, each respective transversely alined pair of air blowers directs a longitudinal airstream e.g. Ve(L5)+Ve(R5), centered along runway axis 11 to meet head-on the longitudinal axis of an aerodynamic aircraft (as indicated as A1 and A2 in FIG. 1) taking off from or landing upon runway 10. As is evident from the FIGS. 1 and 2 schematic views, and as further amplified with the airstream vector analysis of FIG. 3, there can be a cumulative effect of the various air blowers along runway axis 11 provided the respective transversely alined air blower pairs are spaced at sufficiently small increments along runway edges 13 and 14.

As indicated in phantom line in FIGS. 1—3, the nozzle means of the respective air blowers e.g. N(R5), N(L5), etc. is pivotal about the vertical axis e.g. V to an extent of at least 90°—° whereby the major vectorial portion of the airstream from an individual air blower might selectively be directed either toward the runway transverse first end 15 or to the runway transverse second end 16. With such pivotal nozzle means, the natural ground winds might be used to best advantage. For example, if a significant vectorial portion of a natural ground wind should lie along runway axis 11 and toward first transverse end 15, then the air blower nozzles would be employed to point toward first end 15 (as indicated in solid line in FIGS. 1—3) whereby the aircraft would takeoff or land in the 15—16 direction, against the combined natural wind and manufactured airstreams. Conversely, if a significant vectorial portion of a natural ground wind should lie along axis 11 and toward second transverse end 16, then the air blower nozzles would be employed to point toward second end 16 (as indicated in phantom line in FIGS. 1—3) whereby the aircraft would takeoff or land in the 16—15 direction, against the combined natural wind and manufactured airstreams.

The deliverable air volume per unit time is desirably controllably variable. Thus, for the taking off or landing of very heavy aircraft, larger volumes of air per unit time would be appropriate, while smaller volumes of air per unit time would be appropriate to lighter weight aircraft. Moreover, and as will be further described with reference to FIG. 5, less than all of the air blowers might need be utilized for the takeoff or landing of lighter weight aircraft.

Certain of the air blowers, at least the nozzle portion thereof, are desireably movable along a vertical axis V, as indicated in phantom line in FIG. 2 with reference to typical air blower R5. The reason for the desireable vertically reciprocable movement of the airstream generated by the individual air blowers is to accommodate various heights of aircraft, the airfoil wing of heavier and larger aircraft being disposed higher in vertical elevation above runway upper surface 12 than is the airfoil wing of lighter weight and smaller aircraft. Transversely alined pairs of air blowers would be employed at common elevation, at least at the nozzles, to generate an airstream at the desired height.

As indicated in the FIG. 2 elevational view, it is further desireable that the nozzles of those air blowers located nearest to runway transverse ends 15 and 16 e.g. R9, R8, R2, etc., be of a higher vertical elevation than the vertical elevation for the nozzles of those air blowers located medially between ends 15 and 16 e.g. air blowers R6, L6, R5, L5, R4, L4. The reason for the differential elevation is that during the takeoff and landing of aircraft, the aircraft is airborne and the manufactured airstream should be directed at a higher elevation. Of course, as has been alluded to earlier, it would not usually be necessary for smaller aircraft to utilize those air blowers located immediately adjacent to runway transverse ends 15 and 16, and a fortiori, at least those generated airstreams immediately adjacent to runway ends 15 and 16 might be dispensed with for such smaller aircraft.

Figure 4:
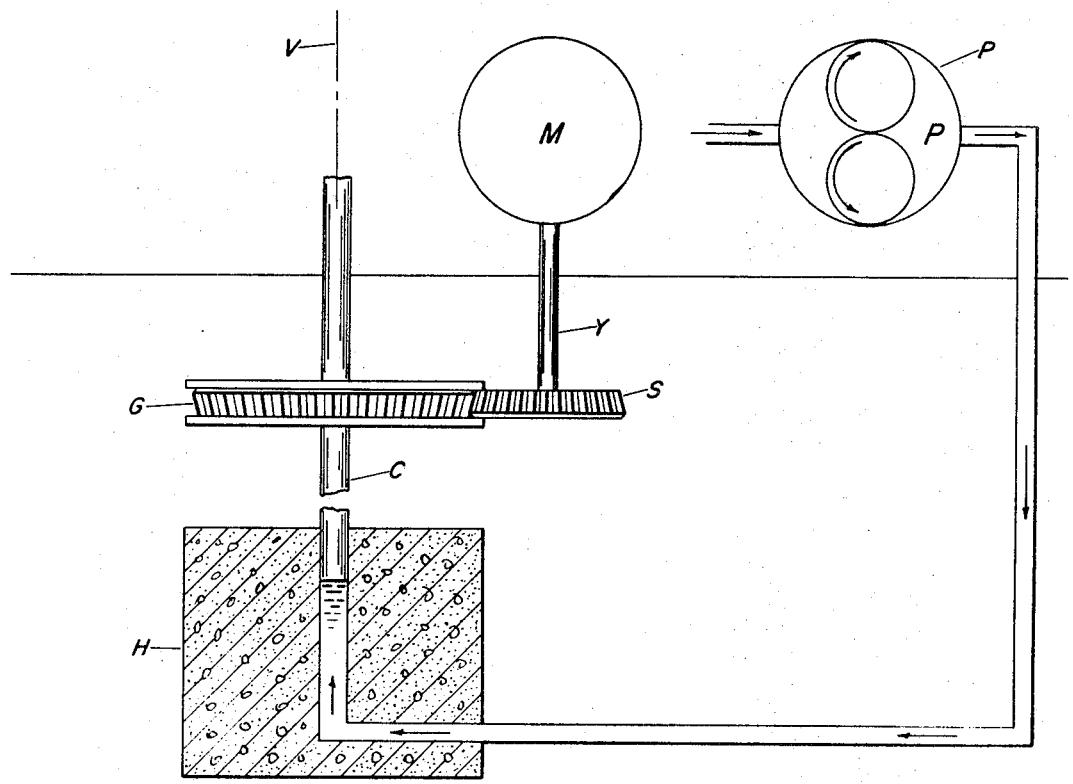
FIG. 4 is a sectional elevational view taken along line 4–4 of FIG. 2.

FIG. 4 indicates schematically in vertical sectional elevation one means for vertically reciprocating air blower R5 and its nozzle N(R5) along its axis V and for pivoting said air blower R5 about its vertical axis V to direct the generated airstream alternatively either primarily toward end 15 or toward runway end 16. Air blower R5 is supported upon column C that carries above the lower end thereof a horizontal bevel gear G having upper and lower flanges. The lower end of column C extends as a piston into a conventional hydraulic mechanism H located below runway upper surface 12, said hydraulic mechanism being actuated by worm gear P whereby column C and attached air blower R5 can be made to reciprocate vertically along axis V. Meshing with bevel gear G is a secondary gear S attached to rotatable shaft Y with motor M whereby as shaft Y rotates air blower R5 is caused to rotate about axis V. The flanges of spur gear G maintain secondary gear S in common elevation therewith even though column C might be actuated vertically. Of course, for vertically nonadjustable air blowers, the hydraulic mechanism H including gear pump P, and also the flanges on bevel gear G might be eliminated.

Figure 5:
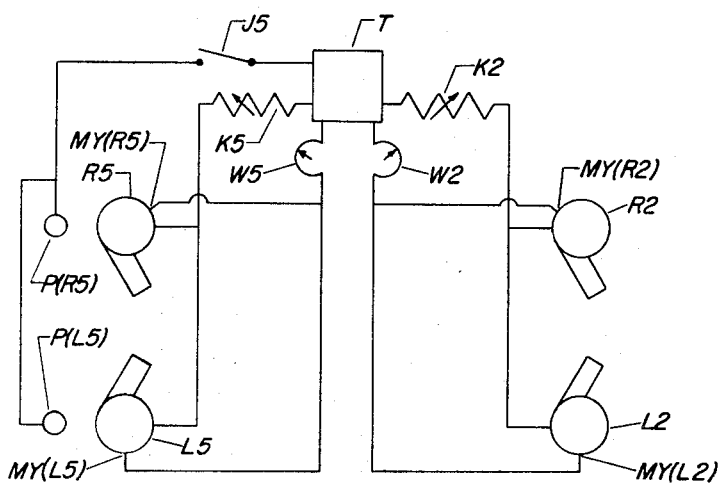
FIG. 5 is a schematic circuit diagram showing a representative manner for controlling from the airport control tower, or other central control station, the apparatus for manufacturing artificial ground winds.

FIG. 5 illustrates schematically a means whereby for each pair of transversely alined blowers the deliverable air rate, the airstream pivoted position about axis V, and the vertical height for the nozzle means might each be separately controlled from control tower T. For example, variable resistor means K5 might control the air volume generated per unit time by air blowers R5 and L5, as by controlling the speed of the air blower turbine in r.p.m., similarly, variable resistor means K2 might control the volumetric air output of air blowers R2 and L2. Rheostat means W5 might control the degree of pivot of the nozzle of air blowers R5 and L5 about their respective axis V as by means of powered rotatable shafts MY(R2) and MY(L2). Finally, the vertical movement of the air blowers R5 and L5 might be controlled with switch J5 that is actuatably connected to gear pumps P(R5) and P(L5). There would be indicators or meters in the control tower T so that delivered air rates and nozzle positions would be evident to control tower personnel.

That portion of the air blower extending above the runway upper surface 12 might include a luminous warning signal 50, as illustrated in conjunction with air blower R6 in FIG. 2, to visually warn the aircraft against straying transversely off runway 10.

The air blowers might be of the multivane turbine-type e.g. R1—R6, R8—R9, L1—L6, L8—L9, or they might be of the jet engine type e.g. R7, L7, or any equivalent type of air blower apparatus capable of generating upwards of 3,000 pounds air thrust.

Thus, it can be seen that the manufactured airstreams described herein are easily controlled in intensity (volume per unit time), in vertical elevation, the number of air blowers used, and the directions of the airstreams, all being controlled from and indicated and recorded within the airport control tower T, whereby the takeoff and landing of various weights, sizes, height, and design of aerodynamic aircraft are assisted by said land-based airstream manufacturing mechanisms.

The spirit of the present invention also includes the use of computers and computer tapes and cards (preprogrammed for various known designs and types of aerodynamic aircraft) to facilitate the control-tower control of the substantially horizontal artificial airstreams, in intensity, in vertical elevation, and in pivoted direction about a vertical axis toward one of the two transverse ends of the runway.

From the foregoing, the construction and operation of the airport with manufactured ground winds directed substantially parallel to the upper surface of an elongate runway will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling with the scope of the appended claims.

I claim:

1. In an airport located upon a suitable underlying substrate and including at least one elongate horizontal hard-surfaced runway comprising a substantially planar horizontal elongate upper surface of finite transverse width and disposed along a longitudinal horizontal axis whereby self-powered aerodynamic aircraft are permitted to takeoff and to land along said runway elongate surface, said elongate runway having a first end and a second end, both ends positioned along said longitudinal axis, the improvement comprising: at least one powered air blower having a nozzle means disposed along a vertical axis and adapted to direct a generated airstream above the runway upper surface with a major vectorial portion of said generated airstream being substantially horizontal and parallel to the runway upper surface and parallel to the runway longitudinal horizontal axis, said powered air blower being pivotal to an extend of at least 90° about said vertical axis whereby the major vectorial portion of the generated airstream might be selectively directed towards either of the two runway ends.

2. The airport of claim 1 wherein there is a plurality of powered air blowers spaced along each of the runway parallel elongate edges; wherein pairs of powered air blowers on respective sides of said runway longitudinal axis are transversely alined, the deliverable air volume per unit time of the two air blowers within each said alined pair being substantially equal whereby the major vectorial portion of each of said two-paired air blowers lies substantially along the runway longitudinal axis.

3. The airport of claim 2 wherein the nozzle means of each of the two air blowers within a said transversely alined pair are positioned substantially equidistant from the runway longitudinal axis; and wherein the nozzle means of both members of a pair of transversely alined air blowers is vertically reciprocatable along a vertical axis.

4. The airport of claim 1 wherein the nozzle means of both members of at least one of said pairs is vertically reciprocatable along a vertical axis.

5. The airport of claim 3 wherein the nozzle means of the two terminal pairs of powered air blowers located nearest to the two respective ends of the runway are adapted to be of higher elevation than that for the nozzle means of the remaining air blowers.

6. The airport of claim 5 wherein there is a control tower attached to the airport underlying substrate a finite distance from the runway and wherein there are control means in the control tower actuatably connected to each powered air blower for controlling and visually indicating: the vertical position of each said nozzle means, the pivoted direction of each said nozzle means, and the air volume rate being delivered by each said air blower, said control means controlling each air blower on an individual basis whereby less than all of said air blowers might be controllably actuated.

7. The airport of claim 4 wherein the said at least one powered air blower is supported upon a vertical column disposed along a vertical axis, said vertical column extending as a piston into a hydraulic cylinder located below the surface of said elongate runway whereby the said powered air blower including the nozzle means therefor is vertically reciprocatable along the said vertical axis.

8. The airport of claim 7 wherein the vertical column support for the powered air blower carries a horizontal bevel gear having upper and lower flanges thereon; wherein there is a secondary gear meshing with the column bevel gear and disposed between the upper and lower flanges of said column bevel gear; and said secondary gear being mounted upon a rotatable vertical shaft including a motor for rotating said vertical shaft whereby rotation of said vertical shaft causes rotation of the powered air blower including the nozzle means therefor about the vertical axis of said vertical column support.

9. The airport of claim 8 wherein the powered air blower is capable of delivering a selectively variable air volume per unit time through the nozzle means; wherein there is a control tower attached to the airport underlying substrate a finite distance from the runway; and wherein there are control means in the control tower actuatably connected to the powered air blower for independently controlling and visually indicating within the control tower each of the following: the vertical position of the nozzle means, the pivoted direction of the nozzle means, and the air volume rate being delivered by said air blower through the nozzle means.